(12) United States Patent
Caretta (10) Patent No.: US 6,336,985 B1
(45) Date of Patent: Jan. 8, 2002

(54) METHOD FOR MAKING A TIRE FOR VEHICLE WHEELS

(75) Inventor: Renato Caretta, Gallarate (IT)

(73) Assignee: Pirelli Coordinamento Pneumatici S.p.A., Milan (IT)

( * ) Notice: Subject to any disclaimer, the term of this patent is extended or adjusted under 35 U.S.C. 154(b) by 0 days.

(21) Appl. No.: 09/126,106

(22) Filed: Jul. 30, 1998

Related U.S. Application Data (60) Provisional application No. 60/054,801, filed on Aug. 5, 1997.

(30) Foreign Application Priority Data

Jul. 31, 1997  (EP) .............................................. 97830401

(51) Int. Cl.⁷ .............................................. B29D 30/08
(52) U.S. Cl. ..................... 156/117; 152/453; 156/121; 156/130; 156/133; 156/135; 156/156
(58) Field of Search ................................ 156/121, 117, 156/133, 130, 131, 118, 111, 126, 127, 156, 135; 152/453, 514, 544, 393, 548

(56) References Cited

U.S. PATENT DOCUMENTS

| 2,915,102 A | 12/1959 | Alexeff et al. |
| 3,245,853 A | 4/1966 | Reinhart, Jr. |
| 3,375,150 A | 3/1968 | Alexeff |
| 3,606,921 A | 9/1971 | Grawey |
| 4,042,435 A | * 8/1977 | Houck ........................ 156/121 |
| 4,049,767 A | 9/1977 | Vaidya |
| 4,052,237 A | * 10/1977 | Appleby et al. ............ 156/117 |
| 4,232,723 A | 11/1980 | Gazuit |
| 4,283,366 A | 8/1981 | Grawey |
| 5,115,852 A | 5/1992 | De Lorean |

FOREIGN PATENT DOCUMENTS

| EP | 0 715 947 | 6/1996 |
| FR | 2 348 066 | 11/1997 |
| GB | 2 118 492 | 11/1983 |
| NL | 7 016 947 | 5/1972 |

* cited by examiner

Primary Examiner—Geoffrey L. Knable
(74) Attorney, Agent, or Firm—Finnegan, Henderson, Farabow, Garrett & Dunner, L.L.P.

(57) ABSTRACT

A vehicle tire is made by inflating a vulcanized air tube to a slight pressure. Then, at least one thread element is wound around the transverse profile of the air tube to form a first carcass ply consisting of turns disposed consecutively in side-by-side relationship. A pair of annular anchoring elements is applied to the first carcass ply. Then, a second carcass ply is formed by winding at least one thread element so as to form turns disposed consecutively in side-by-side relationship along the circumferential extension of the air tube. Associated with the carcass structure is an annular element made up of a belt structure and a tread band. The carcass structure and annular element can be vulcanized separately from each other to make a tire having a tread band susceptible of replacement together with the belt structure.

13 Claims, 7 Drawing Sheets

METHOD FOR MAKING A TIRE FOR VEHICLE WHEELS

CROSS-REFERENCE TO RELATED APPLICATIONS

Applicant claims the right of priority under 35 U.S.C. § 119(a)–(d) based on patent application No. 97830401.2, filed Jul. 31, 1997, in the European Patent Office; additionally, Applicant claims the benefit under 35 U.S.C. § 119(e) based on prior-filed, copending provisional application No. 60/054,801, filed Aug. 5, 1997, in the U.S. Patent and Trademark Office.

FIELD AND BACKGROUND OF THE INVENTION

The present invention relates to a method of making a tire for vehicle wheels, comprising the steps of: forming an air tube of toroidal conformation, having a transverse profile in the form of a closed ring; covering the air tube with a carcass structure, accomplishment of which involves winding of at least one first thread element around the transverse profile of the air tube so as to form first turns disposed consecutively in side-by-side relationship along the circumferential extension of the air tube to define a first carcass ply integrally covering the air tube; and associating a circumferentially-inextensible belt structure and a tread band circumferentially external to the belt structure with the carcass structure at a radially-outer position.

In accordance with the invention, this method leads to achievement of a tire for vehicle wheels of the type comprising: an air tube or inflatable core of toroidal conformation, having a transverse profile in the form of a closed ring; a carcass structure comprising at least one first carcass ply formed of at least one first thread element wound around the transverse profile of the air tube to form first turns disposed consecutively in side-by-side relationship along the circumferential extension of the air tube; a pair of annular elements for anchoring to a rim, axially spaced apart from each other and extending circumferentially on the air tube surfaces at a radially-inner position; a belt structure circumscribing the carcass structure at a radially-outer position relative to the rotation axis of the tire; and a tread band disposed circumferentially at a radially-outer position relative to the belt structure. Still in accordance with the invention said tire can be coupled with one said rim of the type comprising a central portion for engagement with a hub of a vehicle wheel, and engagement means for said tire; the invention further relates to a wheel consisting of said tire and rim assembly.

It is known that tires for vehicle wheels currently have a toroidal conformation the profile of which seen in cross-section is open on its circumferentially-inner side. In more detail, the tire profile seen in cross-section is delimited between two inner circumferential edges defined by corresponding beads axially spaced apart from each other. An inextensible annular element, usually referred to as a bead core, is integrated into each bead and an elastomer filling, usually obtained by extrusion, is to be circumferentially applied to the outer surface of said bead core.

Turned up around the cross-sectional profile of the bead cores are the flaps of one or more carcass plies. Each carcass ply is made up of a plurality of textile cords disposed parallelly in side-by-side relationship and incorporated in an elastomer layer produced with the aid of appropriate calenders fed from an extrusion die. The rubberized fabric obtained from this step is then transversely cut into pieces of the desired length that are subsequently joined together at the respective side edges, optionally by slight mutual overlapping, in order to make a rubberized ply having transversely-disposed textile cords.

The assembly formed of one or more of said carcass plies and the bead cores with the respective elastomer filling form the so-called carcass structure of a tire.

Applied to the carcass structure, at a circumferentially-outer position, is a circumferentially-inextensible belt structure, comprising one or more superposed strips of rubberized fabric formed of textile and/or metallic cords. Circumferentially superposed on the belt structure is a tread band obtained by extrusion, by means of which the tire gets into contact with the ground.

Beads are so structured and shaped that they interact with respective circumferential portions of a rim with which the tire is associated to ensure a steady connection between these two components of a wheel.

In more detail, coupling between the bead and the corresponding circumferential portion of the rim enables the bead to be constantly pushed against an abutment flange by effect of the tire inflation pressure. In tubeless tires, that is, tires devoid of an air tube, coupling between the bead and the corresponding circumferential rim portion is conceived in such a manner that a hermetic seal of the air contained in the tire is also ensured.

In any case, both in tubeless tires and in tires providing employment of an air tube, the task of counteracting the inner inflating pressure of the tire relies on the rim.

In addition to the above described tires having a transverse profile of open section, use of which is almost universally spread for all types of road vehicles, several types of tire of a transverse sectional profile in the form of a closed ring have been proposed. For example, U.S. Pat. No. 4,232,723 discloses a tire having an air tube and a carcass structure essentially comprising a ribbon ply reinforced with radial threads which extends in the circumferential extension of the tire and is wound by its end flaps around the air tube so as to cover it over the whole transverse sectional profile thereof. A belt structure is interposed between the carcass ply and the air tube, at a circumferentially-outer position relative to the air tube; said belt structure has a substantially flat profile in cross-section and is essentially formed of one or more strips extending circumferentially of the tire and turned up around two inextensible annular elements located at the region usually referred to as the tire shoulder.

Coupling between the tire and rim is obtained by a circumferential ridge of one piece construction with the elastomer material forming the tire sidewalls, and extending at a radially internal and centered position relative to the tire.

Another type of tire having a closed cross-sectional profile is disclosed in U.S. Pat. No. 4,283,366, herein reported as an example of the most relevant state of the art in connection with the present invention.

This tire comprises an air tube having a substantially oval sectional profile, a pair of bead cores axially spaced apart from each other and located directly in contact with the air tube, on the side thereof turned towards the tire axis. The assembly formed of the air tube and bead cores is enclosed in a carcass structure essentially formed of a cord spirally-wound about the cross-sectional profile of the air tube. The cord thus wound forms a plurality of turns disposed consecutively in side-by-side relationship along the circumferential tire extension and oriented in respective planes substantially radial to the rotation axis of the tire itself.

Applied to the air tube at a radially-outer position thereof is a belt comprising one or more circumferentially-inextensible belt strips on which the tread band is superposed.

During the carcass structure formation, as well as during the following steps of the construction process, the air tube in a raw state is maintained to its toroidal conformation by an inner core susceptible of disintegration, said core giving the air tube sufficient consistency so as to enable it to bear any type of handling. This core, essentially consisting of powders aggregated by a binder, is disintegrated after vulcanization of the tire and the remaining powders are removed from the air tube through one or more tire inflating valves.

Use of a sufficiently rigid inner core susceptible of disintegration was made necessary in order to enable winding of the carcass cord around the air tube already shaped in an oval form, because the alternative solution of inflating the air tube to give it the necessary consistency during the tire construction steps inevitably caused the air tube to acquire a cross-section circular shape. To the ends of the present invention it is pointed out that "oval" and "elliptic" as herein considered are substantially equivalent terms.

The Applicant has become aware of the fact that laying down of the cord on the air tube having a circular shape in section would involve a variation in the radius of curvature of the cord at the moment of changing the air tube shape from circular to elliptic, as well as a variation in the cord thickness, thereby bringing about an uneven and unbalanced distribution of efforts in the carcass ply.

In accordance with an initial intuition, the Applicant has noticed that thickness control and evenness of the turns disposed on the air tube is, however, less critical for high-performance tires of lowered section, that is, tires in which the ratio between height and width is lower than or equal to 0.70:1.

However, based on this intuition that is only valid for particular items, a solution has been studied that could be appropriate for any type of tire.

SUMMARY OF THE INVENTION

In accordance with the present invention, it has been found that manufacture of a tire can be greatly simplified and improved if the carcass structure is made by winding of one or more thread elements directly on the air tube, the latter being shaped in a substantially elliptic conformation and at least partly inflated to such a degree that it reaches a structural strength adapted to prevent it from being subjected to collapsing during working.

In more detail, the invention relates to a method of making a tire for vehicle wheels, wherein before said covering step, the air tube is conveniently shaped by inflation to a preestablished pressure so as to give it the desired structural consistency in the absence of any inner core and maintained to a substantially elliptic configuration during the steps following the shaping or configuration step.

Preferably, the air tube is pre-vulcanized to a vulcanization degree at least equal to 50% and inflated to an actual pressure not exceeding 0.2 bar.

In accordance with a first embodiment, formation of the air tube involves the steps of: injecting an elastomer material into two opposite cavities defined between two respective mold-halves to be moved close to each other and a forming body or former interposed between said mold-halves, to define two halves of said air tube; removing the former from said mold-halves; moving the mold-halves close to each other so as to make the air tube halves fit together at the respective junction end edges; and pre-vulcanizing the air tube within said mold-halves.

According to a possible alternative embodiment, formation of the air tube involves the following steps: introducing a predetermined amount of rubber latex into a cavity of a mold; causing rotation of the mold about at least two orthogonal axes so as to homogeneously distribute the rubber latex on the surfaces of said cavity; and pre-vulcanizing the air tube.

Advantageously, winding up of said at least one thread element is carried out by causing rotation of a reel carrying the thread element about the transverse profile of the air tube, while the air tube itself is caused to substantially rotate about its own geometric axis of rotation.

Preferably, laying down of said at least one first thread element over the air tube takes place at a portion of the air tube which is guided between two mutually-opposite guide collars.

It is also provided that during winding of said at least one first thread element, delivery of said thread element from the reel should be controlled so as to have a linear extent slightly lower than the outer perimetric extension of the air tube transverse profile, for each turn carried out by the reel about the air tube transverse profile, so that tensioning of the thread element does not exceed 2% of elongation.

Winding of said at least one first thread element can be preceded by a step of applying a first layer of raw elastomer material to the air tube.

This application preferentially takes place by winding a first ribbon element of raw elastomer material around the air tube transverse profile, creating turns disposed after each other in side-by-side relationship so as to form a first elastomer layer integrally covering the air tube itself.

According to a preferential alternative solution, formation of the carcass structure involves simultaneous winding up of at least two first thread elements disposed parallelly to define a first ribbon band.

Preferably, the individual thread element or elements forming said first ribbon band are previously incorporated into a layer of raw elastomer material joining them together before the winding step.

Still in accordance with the present invention, accomplishment of the carcass structure further involves application of a pair of annular anchoring elements to the first carcass ply, said anchoring elements being spaced apart from each other and extending circumferentially at a radially-inner position relative to the air tube.

Preferably, application of said annular anchoring elements is carried out by axially moving the latter towards the air tube, which step is followed by a further rolling step of the annular anchoring elements.

Application of the annular anchoring elements may be preceded by a winding step of at least one second ribbon element of raw elastomer material about the transverse profile of the air tube, creating turns disposed after each other in side-by-side relationship so as to form a second elastomer layer covering the first carcass ply substantially integrally.

According to an alternative embodiment of the method in reference, application of the annular anchoring elements takes place concurrently with closure of the carcass structure into a vulcanization mold within which the annular anchoring elements are arranged.

In this case the annular anchoring elements may be made by injection of elastomer material into respective cavities defined within the vulcanization mold.

Alternatively, the annular anchoring elements are made of an injection-molded elastomer material or by extrusion.

A step of incorporating at least one circumferentially-inextensible annular reinforcing insert into each of said annular anchoring elements may be also provided.

This annular reinforcing insert can be incorporated into the respective annular anchoring element during the manufacturing step of the latter, if it is made of an injection-molded elastomer material.

Alternatively, each of said annular reinforcing inserts can be incorporated into the respective annular anchoring element by fitting through a cut arranged in the annular anchoring element.

Preferably, the annular anchoring elements are pre-vulcanized before being utilized for making said tire.

Still in accordance with the invention, manufacture of the carcass structure further involves application of a holding and reinforcing textile structure to an outer surface of each of said annular anchoring elements.

This reinforcing textile structure may comprise at least one ribbon band applied to the respective annular anchoring element before application of the latter to the first carcass ply or it may be applied to the annular anchoring elements subsequently to their being applied to the first carcass ply.

In the last-mentioned case, the holding and reinforcing textile structure is preferably made by winding at least one second thread element around the transverse profile of the air tube to form turns disposed consecutively in side-by-side relationship along the whole circumferential extension of the air tube in order to define a second carcass ply superposed on the first carcass ply.

Winding up of the second thread element can be preceded by a step involving covering of same with a layer of raw elastomer material.

Formation of the second carcass ply may involve a simultaneous winding of two or more of said second thread elements disposed parallelly in side-by-side relationship so as to form a ribbon band and optionally incorporated in a layer of raw elastomer material joining them together before their winding step.

Application of the second carcass ply is preferably followed by a circumferential cutting step, in which said second carcass ply is cut at a radially-internal region with respect to the air tube included between said annular anchoring elements.

The cut flaps of the second carcass ply are then conveniently shaped to make them adhere to the surfaces of the anchoring elements and the first carcass ply.

Preferably, the method in question further comprises a step of applying protection elements of elastomer material to the outer surfaces of the carcass structure.

Application of these protection elements of elastomer material can be advantageously carried out by closure of the carcass structure inside a vulcanization mold within which the protection elements are arranged.

The protection elements can be obtained by injection of elastomer material into respective cavities defined within said vulcanization mold.

Advantageously, manufacture of the belt structure and tread band involves the following steps: applying at least one belt strip around a support drum; and circumferentially applying a tread band of raw elastomer material about said at least one belt strip, so that said belt structure and tread band form an annular element to be coupled with said carcass strip.

The tread band can be advantageously made by spirally winding at least one continuous ribbon element of elastomer material about the belt structure, said ribbon element being produced by extrusion.

A step of arranging a sleeve of raw elastomer material fitted on the support drum before application of said at least one belt strip may be also provided.

The annular element and carcass structure can be vulcanized separately from each other and mutually coupled in a removable manner.

In this case, at least one circumferential hump is preferably formed at a radially-outer position on the carcass structure, before vulcanization of said carcass structure; in addition, in the belt structure, before vulcanization thereof, at least one anchoring seating conforming in shape to said circumferential hump is also defined.

The circumferential hump may be advantageously made by circumferential winding of at least one ribbon element around the carcass structure.

According to a possible alternative embodiment, the annular element and carcass structure are vulcanized simultaneously after their mutual coupling.

According to a further innovatory and advantageous aspect of the invention, during vulcanization the carcass is inflated by admission of a fluid under pressure to the air tube.

The carcass can be also maintained in an inflated condition during a cooling step carried out after said vulcanization step. Vulcanization can be carried out either through heat supply by microwaves or through heating of the mold walls by electromagnetic induction.

In accordance with a possible embodiment, said belt structure can be obtained by winding at least one belt strip directly around the carcass structure.

BRIEF DESCRIPTION OF THE DRAWINGS

Further features and advantages will be more apparent from the detailed description of some preferred but non-exclusive embodiments of a tire for vehicles in accordance with the present invention, coupled with a respective rim.

This description will be taken hereinafter with reference to the accompanying drawings, given by way of non-limiting example, in which.

DESCRIPTION OF THE PREFERRED EMBODIMENT

In each of said figures, the different wheel components in accordance with the invention are distinguished by the same reference numerals as used for the corresponding wheel parts in the other figures.

Figure 1:
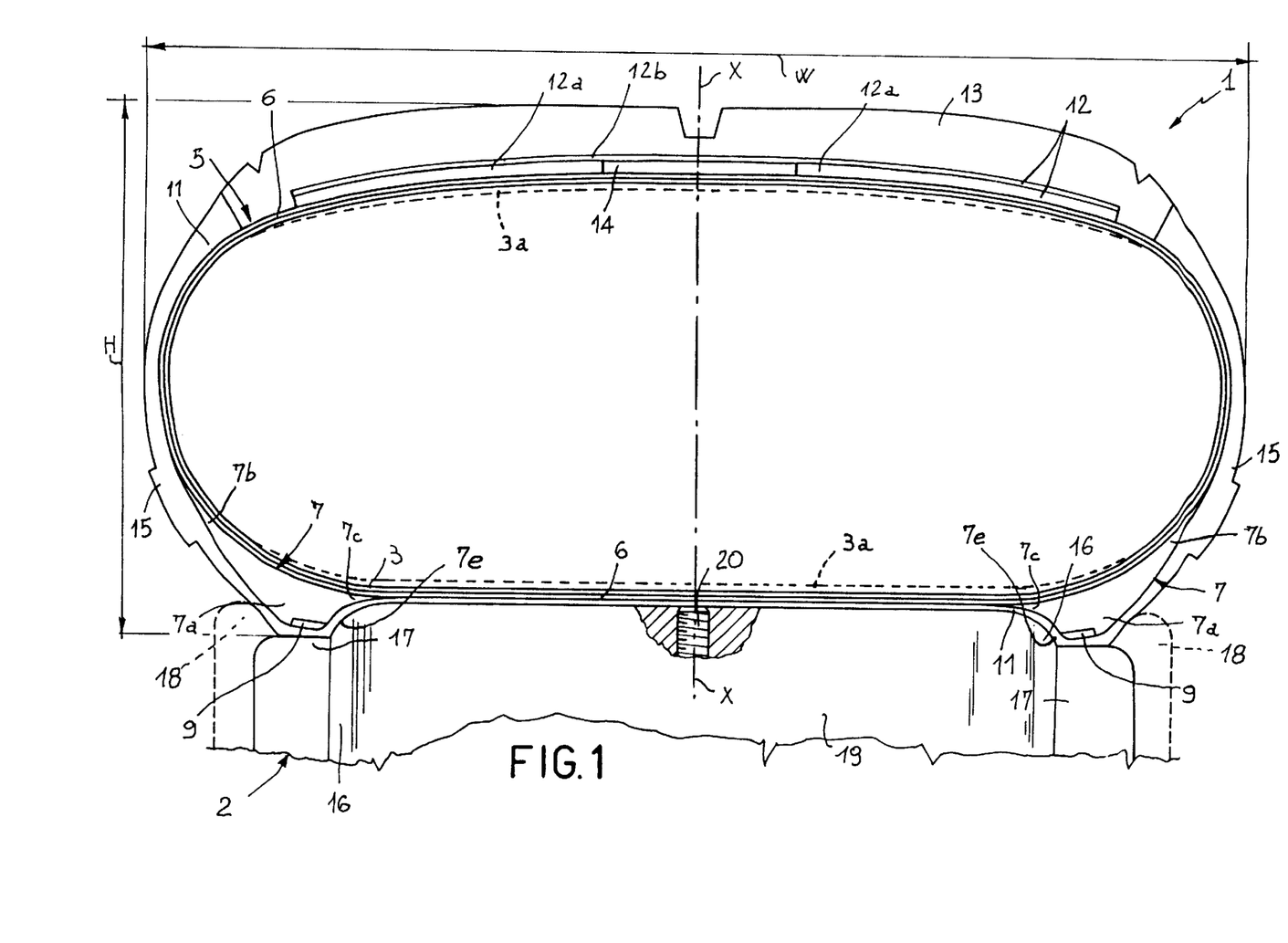
FIG. 1 is a half-section of a wheel made up of a tire and a rim made in accordance with the present invention, seen in section along a plane radial to the rotation axis of the tire.
Figure 2:
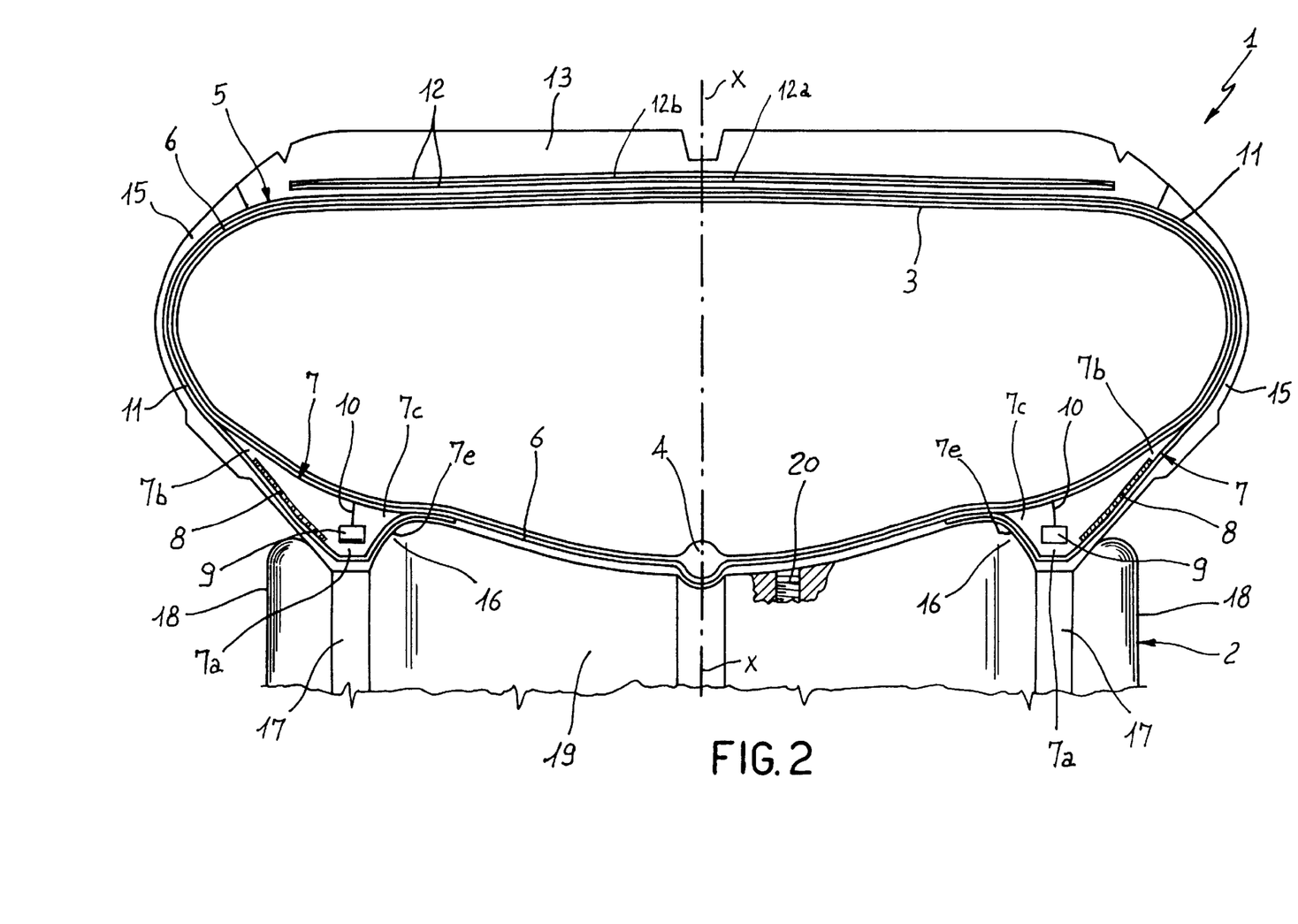
FIG. 2 is a half-section similar to FIG. 1, based on a second embodiment of a wheel in accordance with the invention.
Figure 3:
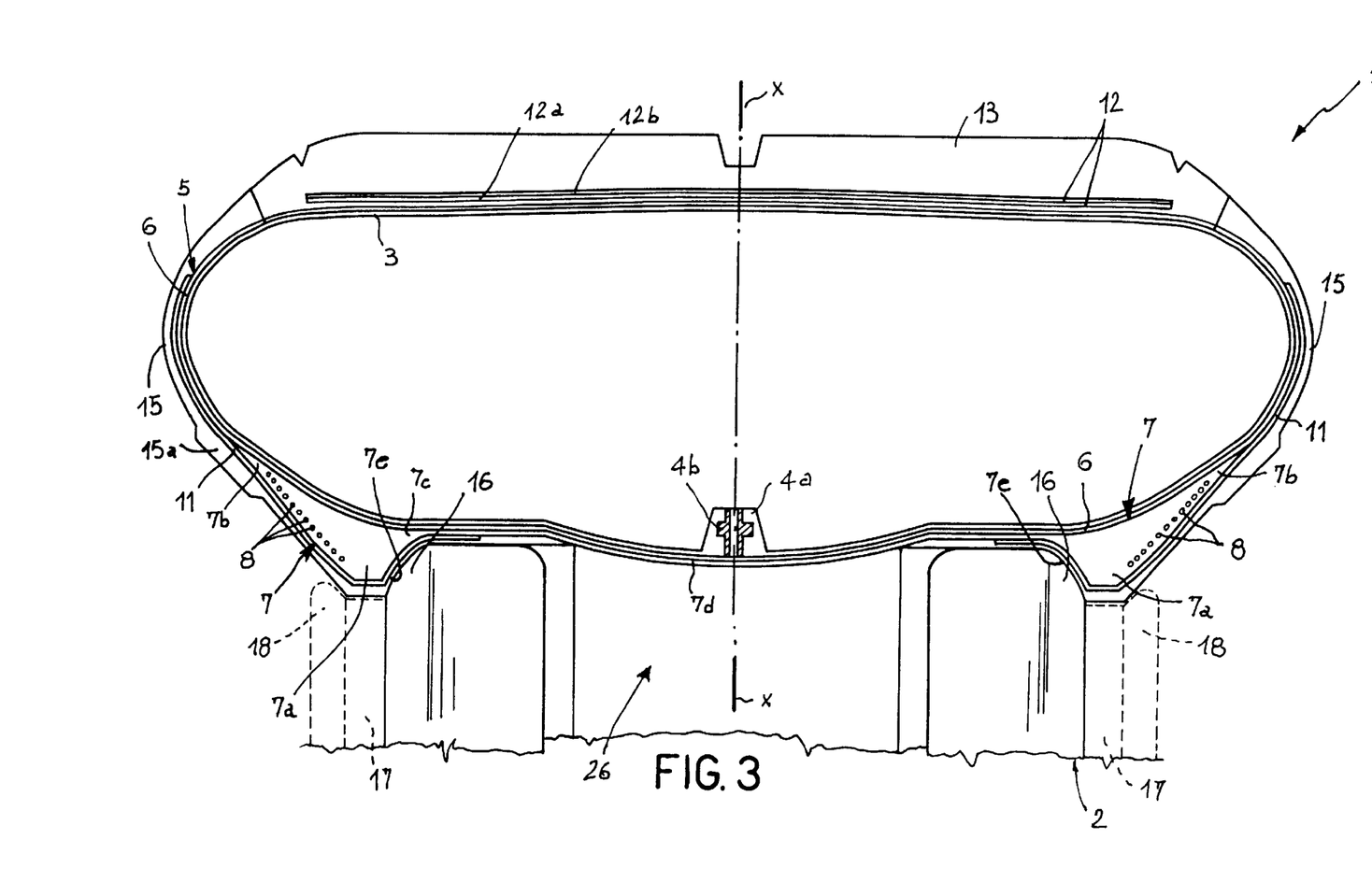
FIG. 3 shows a third embodiment of a wheel also seen in section along a plane radial to the rotation axis of the tire.

For the sake of clarity in the drawings, section chain lines have been purposely omitted from tires shown in FIGS. 1, 2, and 3.

The foregoing being stated, a tire for vehicles in accordance with the present invention has been generally identified by reference numeral 1.

Tire 1 lends itself to be associated with a respective rim 2 so that altogether they define a vehicle wheel.

Tire 1 comprises an air tube 3 of toroidal conformation, essentially defined by a tubular element extending circumferentially about the geometric axis of the tire.

To the purposes of the present invention, by "inflatable core" it is intended an inflatable toroidal element such as an air tube 3, for example, or a composite element wherein the air tube is only one of the parts forming it. For description purposes, this inflatable core will be in the following also called "air tube", unless said core is a composite element obtained by associating the air tube with an element external thereto.

As shown in the accompanying figures, the air tube 3 has a transverse profile in the form of a closed ring of an elongated elliptic configuration parallel to the rotation axis of the tire. By transverse profile it is herein intended the configuration offered by the air tube half-section cut through a plane radial to the rotation axis of tire 1.

As already seen, maintaining this elliptic configuration during the tire manufacturing steps, even on increasing of the inflating pressure, is essential for achieving a high qualitative level in the finished tire.

The air tube 3 is preferably made of a material impervious to air, natural or butyl rubber, for example, preferably butyl rubber, adapted to withstand more than one vulcanization cycle without losing its mechanical and imperviousness features.

In more detail, the air tube 3 can be advantageously obtained by an injection molding process according to a technique usually known as "molding of hollow bodies". In accordance with this technique, an elastomer material, preferably butyl rubber, is injected into two opposite cavities defined between two respective mold halves located close to each other and an inner core or former interposed between the mold halves. Said former is of such structure and sizes that it keeps the mold halves slightly separated from each other, so that the end edges of the air tube halves are mutually separated at the end of the injection step. When injection has been completed, the core or former is removed from the mold halves and said mold halves are moved close to each other so that they bring the air tube halves to fit together at the respective opposite end edges. The air tube closed in the mold is vulcanized or pre-vulcanized until a vulcanization degree of at least 50% causing, by effect of molecular cross-linking of the elastomer material, combination of the two parts to form a single piece.

To the purposes of the present invention, the above mentioned known molding art for hollow bodies is preferred in that it enables regions of differentiated resistance to pressure to be formed in the extension of the transverse profile of the air tube. In particular, regions of greater thickness and/or differentiated resistance 3a can be obtained at the tire intrados and/or extrados, for example, in order to ensure maintaining of the elliptic conformation by the air tube during the following steps of the manufacturing process.

In addition or in the alternative to the above solution, these regions of greater thickness and/or differentiated resistance 3a may be made of materials of different modulus, preferably greater than that used to make the remaining part of the air tube 3.

Formation of the air tube 3 can be also obtained, for example, by a molding process according to which a very fluid elastomer material, such as rubber latex, for example, is introduced into the cavity of a mold which is subsequently set in rotation on a gyroscopic system defined by at least two orthogonal axes. Rotations performed by the mold about either axis of the gyroscopic system are controlled in such a manner that a homogeneous distribution of the elastomer material on the inner walls of the mold cavity is ensured. When distribution is over, the elastomer material is vulcanized or pre-vulcanized following the desired vulcanization degree.

Alternatively, the air tube 3, independently of how obtained, can be employed for one or more steps of the manufacturing process of the raw carcass in a non-vulcanized form.

The air tube 3 can be advantageously provided, for said core formation, with at least one raised body that in the embodiment shown in FIG. 2 is defined by a circumferential ribbing 4 located at a radially-inner position relative to the air tube itself.

This circumferential ribbing 4 can be advantageously utilized, as will be better understood in the following, as a reference and guide element during the working processes for making tire 1. The circumferential ribbing 4 can be advantageously made of a self-sealing material, so as to enable admission of air for tire-inflating purposes by means of a needle or the like introduced into the raised body. In a manner known per se, upon drawing out of the inflating needle, the self-sealing material forming the circumferential ribbing 4 closes upon itself, thereby causing a hermetic seal of the hole produced by the needle.

In accordance with a further alternative solution shown in FIG. 3, circumferential ribbing 4 is replaced by one or more raised bodies 4a of one-piece construction with the air tube 3 and projecting internally thereof. Preferably, four raised bodies 4a are provided and they are disposed circumferentially, being spaced apart 90° from each other. Defined in each raised body 4a, directly during the step of forming the air tube 3, is a seating into which an airtight, one-way valve 4b is fitted. Valve 4b, known per se and therefore not further described, can advantageously be made of an elastomer material incorporating fillers of magnetic material. This enables the valve 4b to be easily identified with the aid of appropriate sensor means for the purpose of inflating the tire, in spite of its being invisible from the outside in that it is hidden under the carcass structure 5.

For tire inflation, circumferential ribbing 4 and/or raised body 4a can be replaced by a one way valve provided with a closure member of known and conventional type.

The air tube 3 is enclosed in a carcass structure 5 comprising at least one first carcass ply 6 directly made about the closed ring-shaped transverse profile of the air tube itself. More particularly, the first carcass ply 6 is advantageously formed of at least one thread element, consisting of a monofilament or a bundle of monofilaments, for example, or a textile cord of sizes included between 0.28 mm and 1.2 mm measured following ASTM-D-1777 standard, wound about the transverse profile of the air tube so as to form turns disposed consecutively in side-by-side relationship at least at the radially-inner surfaces of the air tube 3, and distributed over the whole circumferential extension of the air tube itself.

The material of said thread element can be any known textile or metallic material, adapted for the purpose: preferably used are either natural fibers such as rayon or synthetic fibers such as aramide, nylon, polyester fibre, or polyethylene-naphthalene-2,6-dicarboxylate, best known as PEN.

Each of the turns formed by the thread element is preferably disposed in a plane substantially radial to the rotation axis of the tire. More specifically, each of the turns forming the first carcass ply 6 should preferably be oriented at an angle included between 73° and 90°, 87°, for example, relative to the circumferential-extension direction of the tire.

Figure 4:
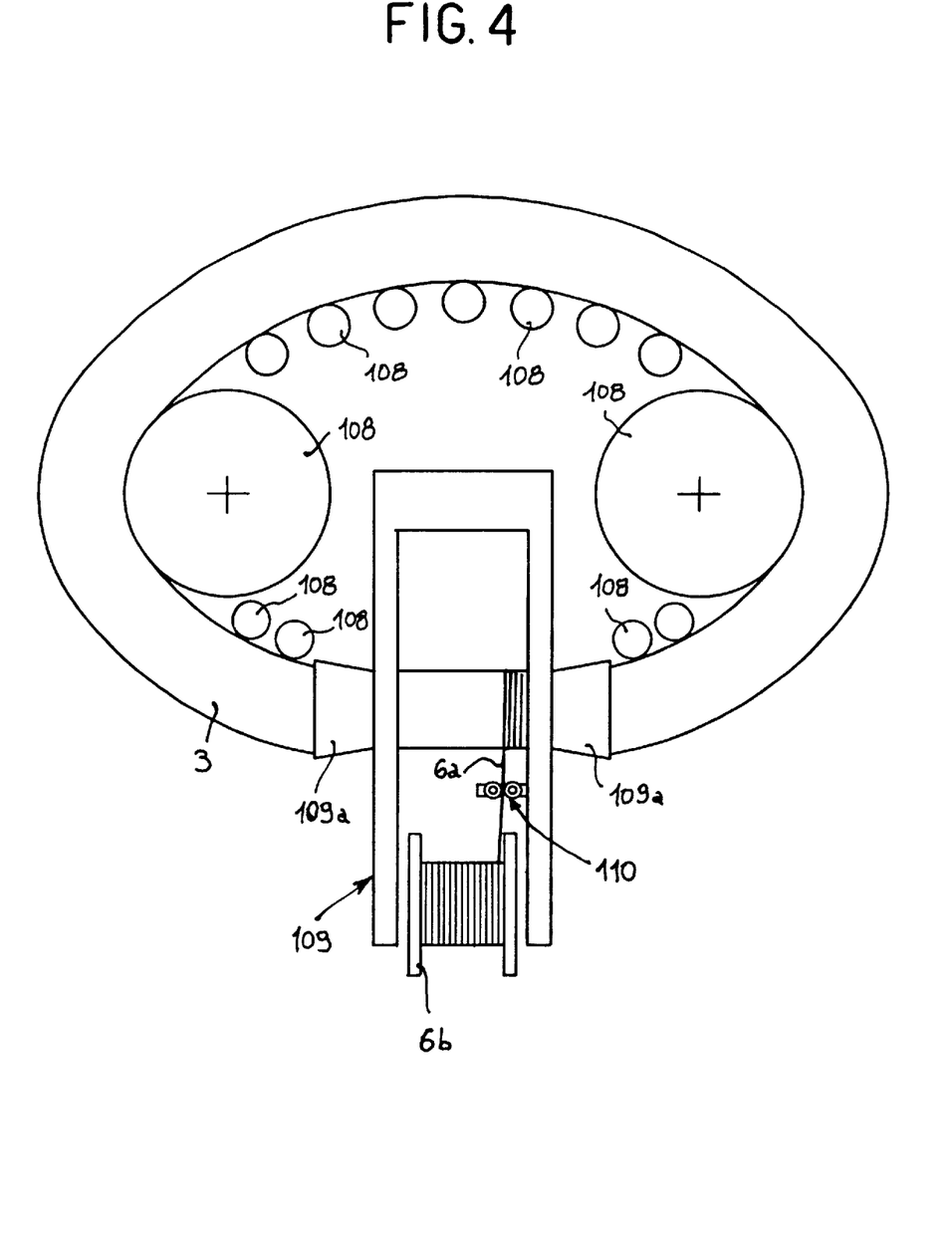
FIG. 4 diagrammatically shows accomplishment of a winding step of a thread element for making a carcass structure about the transverse profile of an air tube.
Figure 6:
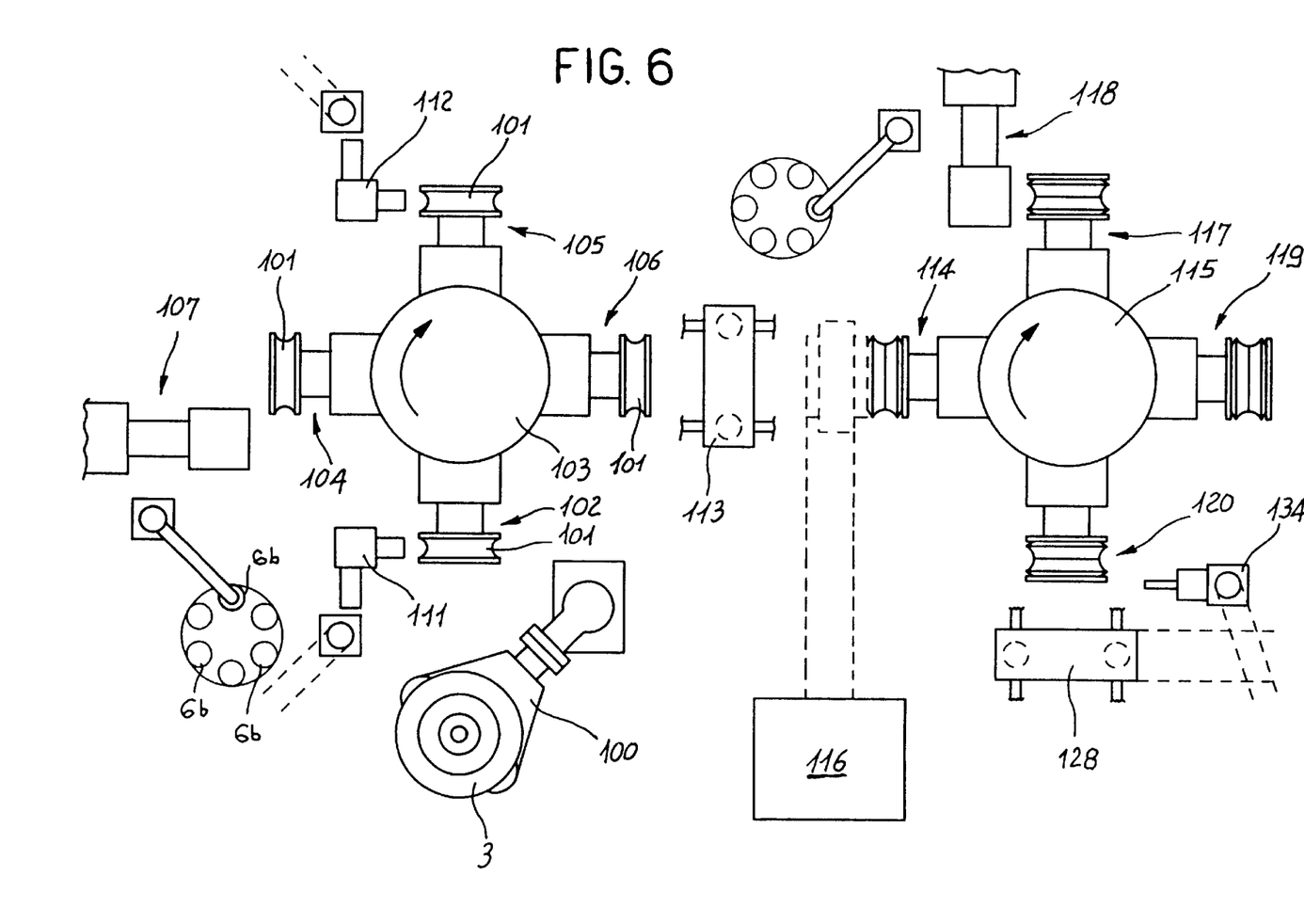
FIG. 6 is a schematic top view or a plant for making tire carcasses in accordance with the process in reference.

As clearly shown in FIGS. 4 and 6, for making the first carcass ply 6 it is advantageously provided for the air tube 3 to be mounted, by a handling device 100, on a support drum 101 located in a first working station 102. The support drum 101 can be mounted on a first revolving turret 103 carrying three other similar support drums 101, for example, that are disposed at a second, third, and fourth working stations 104, 105, and 106, respectively.

Through valve 4b, the air tube 3 is inflated to an actual pressure greater than the atmospheric pressure, preferably included between 0.01 and 0.2 bar, and preferably corresponding to 0.075 bar.

By this inflation, the air tube 3 takes a substantially elliptic conformation. To the purposes of the present invention, shaping of an element involves a variation in volume of the element itself, usually in terms of volume increase.

Following an angular rotation performed by the first revolving turret 103, the air tube is transferred to a first winding unit 107 located close to the second working station 104, to be fitted—as shown in FIG. 4, on a guide and movement device comprising a set of guide rollers 108.

At least one of the guide rollers 108 can be set in rotation so as to cause the air tube to turn according to the rotation axis of the tire.

Circumferential ribbing 4 can be advantageously utilized for guiding the air tube 3 in its movement according to the rotation axis of the tire.

The first thread element 6a is previously wound on a reel, spool, or other appropriate support element 6b, mounted on a rotating annular distributor 109 that is disposed about the transverse profile of the air tube. The annular distributor 109 can be driven in rotation about its own axis so that the support element 6b of first thread element 6a is caused to turn about the sectional profile of the air tube 3, while the air tube 3 is caused to rotate substantially about its own geometric axis of rotation upon the action of the guide rollers 108.

The rotation speed of the air tube about the rotation axis of the tire and the revolution speed of the support element 6b carrying first thread element 6a around the circumferential direction of the air tube 3, can be easily adjusted with respect to each other, so that turns formed by the cord are laid down at the desired thickness, preferably included between 60 and 120 cords/dm and at the desired angle relative to the circumferential-extension direction of the tire.

Laying down of turns in planes substantially radial to the tire axis gives rise to a thinning or decrease in the turn thickness at the radially-outermost regions of the air tube, relative to the radially-innermost regions. The variation in thickness resulting from this thinning is, however, within the provided tolerance limits.

Preferably, laying down of first thread element 6a on the air tube 3 takes place at a portion of said air tube that is guided between two mutually-opposite guide collars 109a, axially passed through by the air tube 3 so as to cause centering of the latter relative to the rotation axis of the annular distributor 109 and shaping in conformity with the desired transverse profile.

The desired shaping of the air tube 3 in an elliptic conformation can be also achieved or facilitated by creating regions of differentiated resistance through application of one or more circumferential strip elements intended to form said core in association with said air tube 3, at a radially-outer and/or -inner position relative to the air tube itself, in addition to or in place of arranging regions having greater thickness and/or differentiated resistance 3a and guide collars 109a.

Advantageously, during the above described winding step, first thread element 6a is engaged by a driving unit 110 mounted on the annular distributor 109 and engaging the thread itself at a portion included between the support element 6b and the air tube 3. The driving unit 110, not described in detail as it can be made in a manner known per se and in any case not of importance to the ends of the invention, is essentially comprised of a capstan driven in rotation in synchronism with the rotation of the annular distributor 109, so as to constantly control delivery of first thread element 6a from the support element 6b.

In more detail, delivery of first thread element 6a is provided to take place, for each turn carried out by support element 6b around the transverse profile of the air tube 3, to an extent slightly lower than the outer perimetric extension of said transverse profile. Thus, one can be sure that first thread element 6a is laid down delicately on the air tube 3, preferably with a tension not exceeding an elongation of 2%, so that too important deformations of the air tube are not involved.

Still in accordance with the present invention, formation of the first carcass ply 6 can take place by simultaneous winding of two or more cords or thread elements disposed parallelly so that ultimately they form a first ribbon band that will be wound following the same modalities as previously described with reference to winding of a single cord. Preferably, said ribbon band comprises two to twenty thread elements parallel to each other.

Advantageously, at least one first layer of elastomer material (not shown in the accompanying figures) may be interposed between the first carcass ply 6 and the air tube 3. This first layer is created, for example, by applying a sheet of elastomer material in a raw state to the air tube before formation of first carcass ply 6 by means of a first extrusion die 111, for example, operating in the first working station 102.

In a preferential solution, the first layer of elastomer material is preferably formed by winding a ribbon element of elastomer material on the circumferential extension of the air tube 3 so as to form turns disposed consecutively in side-by-side relationship, in the same manner as previously described with reference to the cord forming the first carcass ply 6.

The elastomer material applied in a raw state ensures the optimal adhesion of the cord or cords laid down to form the first carcass ply 6 and, in addition, prevents the material forming the air tube 3 from being possibly damaged as a result of shearing stresses transmitted from the inextensible cord forming the carcass ply.

Advantageously, the first thread element 6a or the thread elements forming the first ribbon band employed in making the first carcass structure 5 are provided to be directly incorporated, by an extrusion operation, into a layer of raw elastomer material joining them together before their being applied to the air tube 3. In this way application of the first layer of raw elastomer material in the first working station 102 can be avoided.

In a third working station 105, a second layer of raw elastomer material can be applied to the first carcass ply 6 formed in the second working station 104. The second elastomer layer may directly come from a second extrusion die 112, or it may consist of a second ribbon element of raw elastomer material that is wound around the transverse profile of the air tube 3 in turns disposed successively side-by-side, to cover the first carcass ply 6 in a substantially integral manner, by an apparatus similar to the one employed in forming said carcass ply.

Application of this second elastomer layer can be avoided as well, if in making the first carcass ply 6, a thread or a band of threads incorporated in a layer of elastomer material is utilized.

The carcass structure 5 further comprises a pair of annular anchoring elements 7, axially spaced apart from each other and extending circumferentially in a radially-inner position on the surface of said air tube 3. By means of these annular anchoring elements 7, preferably made of an elastomer material optionally reinforced with aramidic fibers and having a hardness included between 72° and 94° A Shore, a steady engagement between the tire 1 and rim 2 is achieved, as better illustrated in the following.

For the above purpose, each annular anchoring element 7 preferably has a main portion 7a, the cross-sectional profile of which is substantially cusp-shaped, so as to define an inner circumferential projection relative to the air tube 3 and the first carcass ply 6 formed thereon. Each anchoring element 7, in addition, has at least one prolongation portion 7b extending from the main portion 7a and tapering away from the rotation axis of the tire. On the opposite side from the prolongation portion 7b, each annular anchoring element 7 has a radially-and axially-internal end portion 7c tapering in the direction of the equatorial median plane of the tire, denoted by line X-X.

As shown in FIG. 3, the radially- and axially-internal end portions 7c of the annular anchoring elements 7 can be prolonged until they meet so as to form an interconnecting portion 7d between the anchoring elements, thereby stabilizing the mutual axial positioning of same. This solution may appear to be particularly advantageous during the tire manufacturing step in order to easily establish the exact positioning of the anchoring elements relative to the air tube 3 and the first carcass ply 6 formed thereon.

Each annular anchoring element 7 can be also provided, preferably at the prolongation portion 7b thereof, with at least one textile reinforcing band 8 that can be surface-applied as shown in FIG. 2 or incorporated into the anchoring element, as shown in FIG. 3.

The annular anchoring elements 7 can be made by injection molding or by extrusion. In the example in FIG. 6, for application of said anchoring elements to the first carcass ply 6, the carcass structure 5 during its manufacturing step is picked up from the fourth working station 106 by a first transfer ring 113, to be mounted on a fifth working station 114 interlocked to a second revolving turret 115.

The annular anchoring elements 7 formed in a molding station 116, for example, reach the fifth working station 114 where they are applied to the first carcass ply 6, being preferably axially moved close to the air tube 3. This axial approaching step can be carried out by a step involving rolling of the annular anchoring elements 7 carried out in a manner known per se, in order to ensure an intimate adhesion of said annular elements to first carcass ply 6 or the second layer of elastomer material covering said carcass ply.

As shown in the embodiments in FIGS. 1 and 2, each annular anchoring element 7, in addition, may comprise at least one annular reinforcing insert 9 which is at least partly incorporated in the main portion 7a. In more detail, the annular reinforcing insert 9 can appear on the surface of the main portion 7a, at a radially-inner position, as can be seen in the embodiment in FIG. 1.

In this case, the annular reinforcing insert 9 can be partly incorporated in the respective annular anchoring element 7 during the injection molding step carried out for making said annular anchoring element 7. Alternatively, the annular reinforcing insert 9 can be integrally incorporated in the main portion 7a, as shown in FIG. 2. In the last-mentioned case, the annular anchoring element 7 is preferably provided with at least one circumferential fitting cut 10 extending from the annular reinforcing insert 9 to an outer surface of the main portion 7a, preferably at a radially-outer position relative to said main portion 7a. Through this circumferential fitting cut 10, fitting of the annular reinforcing insert 9 into the annular anchoring element 7 is carried out. Said anchoring element can be pre-vulcanized before its use in making tire 1.

Advantageously, the annular reinforcing insert 9 can be made either of a metallic material or of a textile material such as an aramidic fibre, preferably by one or more thread elements wound around the rotation axis of tire 1 so as to form turns thereon, substantially in the same manner as usual reinforcing bead cores in known tires having an open toroidal profile.

Advantageously, each annular anchoring element 7 is externally applied to the first carcass ply 6. In an alternative embodiment of the present invention viewed in FIGS. 2 and 3, each annular anchoring element 7 is further covered, on the opposite side relative to the carcass ply, with at least one textile holding and reinforcing structure 11. Preferably this textile holding and reinforcing structure 11 goes beyond the opposite circumferential edges of the anchoring element, extending over the first carcass ply 6.

In the embodiment shown in FIG. 3, the textile holding and reinforcing structure 11 for each anchoring element 7 comprises at least one ribbon band extending along the whole circumferential extension of the anchoring element.

This ribbon band, for instance, can be comprised of cords of natural or synthetic textile fibre, aramide fibre, for example, disposed parallel to each other, oriented at an angle included between 0° and 17° relative to the extension direction of the cords belonging to the first carcass ply 6, preferably in a symmetric manner relative to a meridian plane of the tire.

The ribbon band can be advantageously applied to the respective annular anchoring element 7 before or after application of the anchoring elements to the first carcass ply 6.

Alternatively, as shown in the embodiment in FIG. 2, the textile holding and reinforcing structure 11 can be made of at least one second carcass ply extending around the first carcass ply 6 and the annular anchoring elements 7.

The second carcass ply can be advantageously made at a sixth working station 117 provided with a second winding unit 118 similar to the first winding unit 107.

In this case, the second carcass ply is made by winding at least one second thread element around the first carcass ply and the annular anchoring elements 7, in the same manner as explained with reference to the first carcass ply 6, thereby obtaining turns disposed consecutively in side-by-side relationship along the circumferential extension of the annular anchoring elements 7. In this case, too, the thread element utilized in making the second carcass ply can be incorporated in a layer of elastomer material. The second carcass ply may be also made by simultaneously winding two or more second thread elements disposed parallelly side by-side to form a second ribbon band comprising two to twenty second thread elements, for example, optionally incorporated in said layer of elastomer material.

The material of said thread elements can be any convenient known textile, metallic, natural, or synthetic material, and it can even be the same material as the one utilized for making the first carcass ply 6. Preferably, turns forming the second carcass ply are oriented at an angle included between 73° and 90° relative to the circumferential-extension direction of the tire, oppositely to the orientation of the turns belonging to the first carcass ply 6. Preferably the cord or cords employed in making the second carcass ply have a size included between 0.28 mm and 1.2 mm, measured following ASTM-D-1777 standard, and the turns they form are distributed with a thickness included between 60 and 120 cords/dm, measured at a circumferential position external to the air tube 3.

If the thread elements employed in making the second carcass ply are not previously covered with elastomer material, application of a third layer of elastomer material around the second ply may be provided. This application can be carried out in a seventh working station 119, in the same manner as previously described with reference to application of the first and second elastomer layer, if any.

As shown in FIG. 2, the circumferential extension of the second carcass ply can be stopped at the radially-inner region of the tire included between the annular anchoring elements 7.

Interruption of the circumferential extension of the second carcass ply can be advantageously carried out by circumferentially cutting the carcass ply itself once the helical winding of the cord or cords to form said carcass ply has been accomplished. This cutting operation is made easier by the fact that at the region included between the annular anchoring elements 7, the second carcass ply is located spaced apart from the first carcass ply 6 because the cusp-shaped main portion 7a of each annular anchoring element 7 projects at a radially-inner position from the first carcass ply.

Once the circumferential cutting operation has been completed, the flaps of the second carcass ply can be applied to the inner end portions 7a of the annular anchoring elements 7 and the radially-inner portion of the first carcass ply 6, so that they conform in shape to the transverse sectional profile of said annular anchoring elements 7, by means of a rolling operation, for example.

The above mentioned cutting and rolling steps can be carried out at an eighth working station 120.

Preferably, as previously described and illustrated in the accompanying figures, the cross-sectional profile of the air tube 3 and the carcass structure 5 has an axially-elongated elliptic configuration relative to the tire. Preferably the ratio between the maximum radial size H and maximum axial size W of the tire taken as a whole is lower than or equal to 0.65:1.

Tire 1 further comprises a belt structure 12 circumscribing the carcass structure 5 at a radially-outer position with reference to the rotation axis of the tire. Circumferentially applied to the belt structure 12 is a tread band denoted by 13.

Belt structure 12 can be made by winding of at least one belt strip directly around the carcass structure 5.

Figure 7:
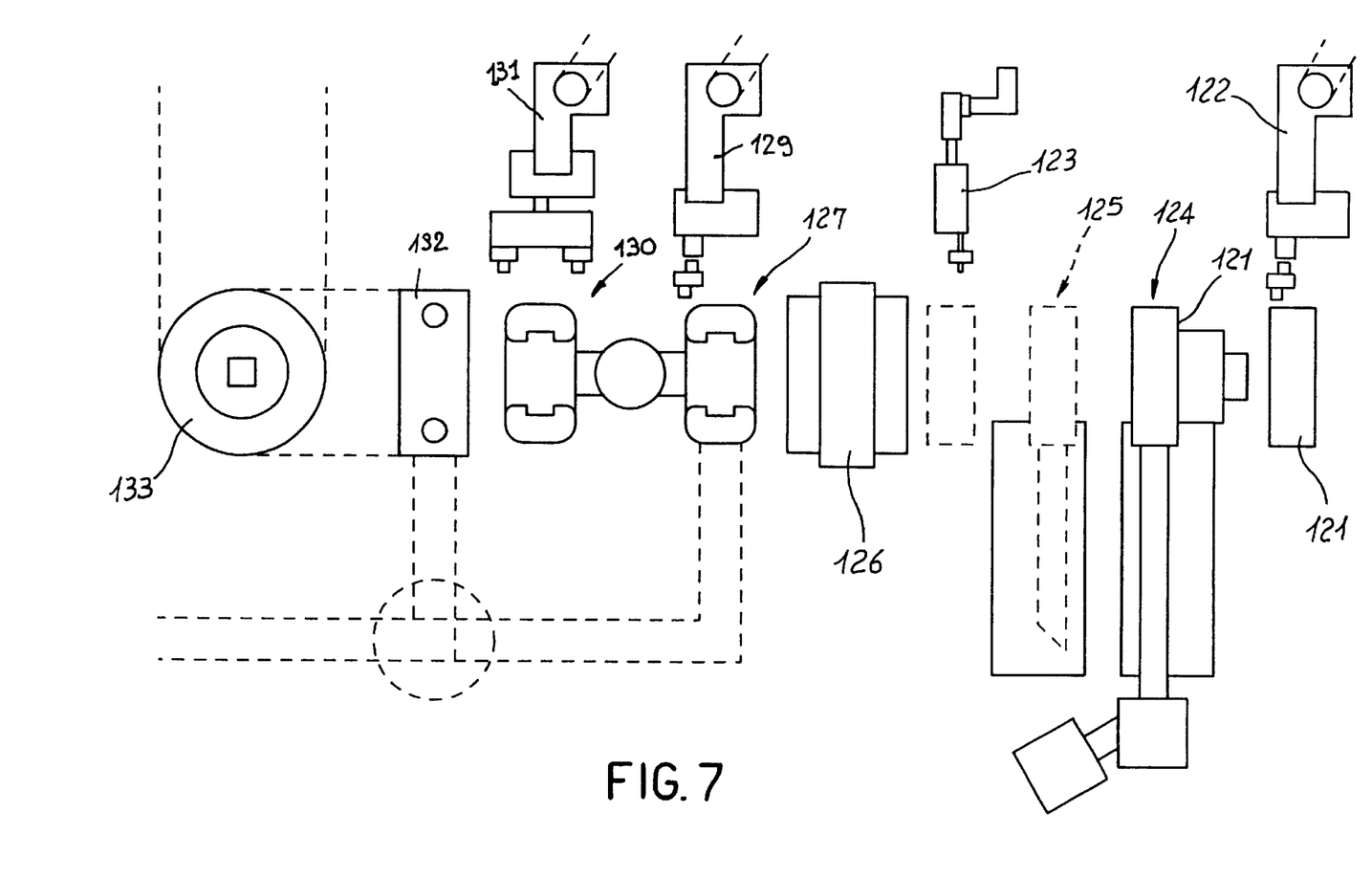
FIG. 7 is a schematic view of a plant portion to be used for making belt and tread band structures.

Alternatively, as shown by way of example in the schematic view in FIG. 7, for accomplishment of belt structure 12, first formation of a sleeve of elastomer material 12a (FIGS. 1–3) is provided by winding up a ribbon strap directly fed from a third extrusion die 122 on a cylindrical drum denoted by 121 in FIG. 7, for example, so as to form turns disposed axially in side-by-side relationship.

Alternatively, sleeve 12a can be formed directly by extrusion of a tubular workpiece, which is then fitted on the cylindrical drum 121. Then, an inextensible belt strip is applied to sleeve 12a, which belt strip is obtained from a spiraling unit 123, for example, that carries out winding of one or more cords to form a plurality of circumferential turns disposed consecutively side-by-side.

As shown in FIG. 7, application of the inextensible belt strip 12b can be preceded by application of one or more mutually-crossed cord-made strips, these applications being carried out in a first and a second application stations 124, 125, respectively.

Through a second transfer ring 126, the belt structure 12 is then picked up from the operating site interlocked to the spiraling unit 123, to be fitted on the previously produced carcass structure 5 and transferred from the eighth working station 120 to a ninth working station 127, by means of a third transfer ring 128, for example.

In this ninth station 127, application of the tread band 13 to the belt structure 12 can be carried out. The tread band 13 can be advantageously made by winding of at least one continuous elongated element of raw elastomer material around the belt structure. This continuous elongated element can be advantageously produced by a fourth extrusion die 129 directly operating on the ninth working station 127.

Application of further tire components can be carried out, for example, in a tenth working station 130. Such components may be, for instance, the tire sidewalls 15 that can be also produced by circumferentially applying a continuous strip element of raw elastomer material to the carcass structure 5. This continuous strip element too can be produced by a respective fifth extrusion die 131 operating in the tenth working station 130.

By a fourth transfer ring 132 or equivalent means the thus manufactured tire can be then introduced into an appropriate mold 133 and submitted to a vulcanization step.

Figure 5:
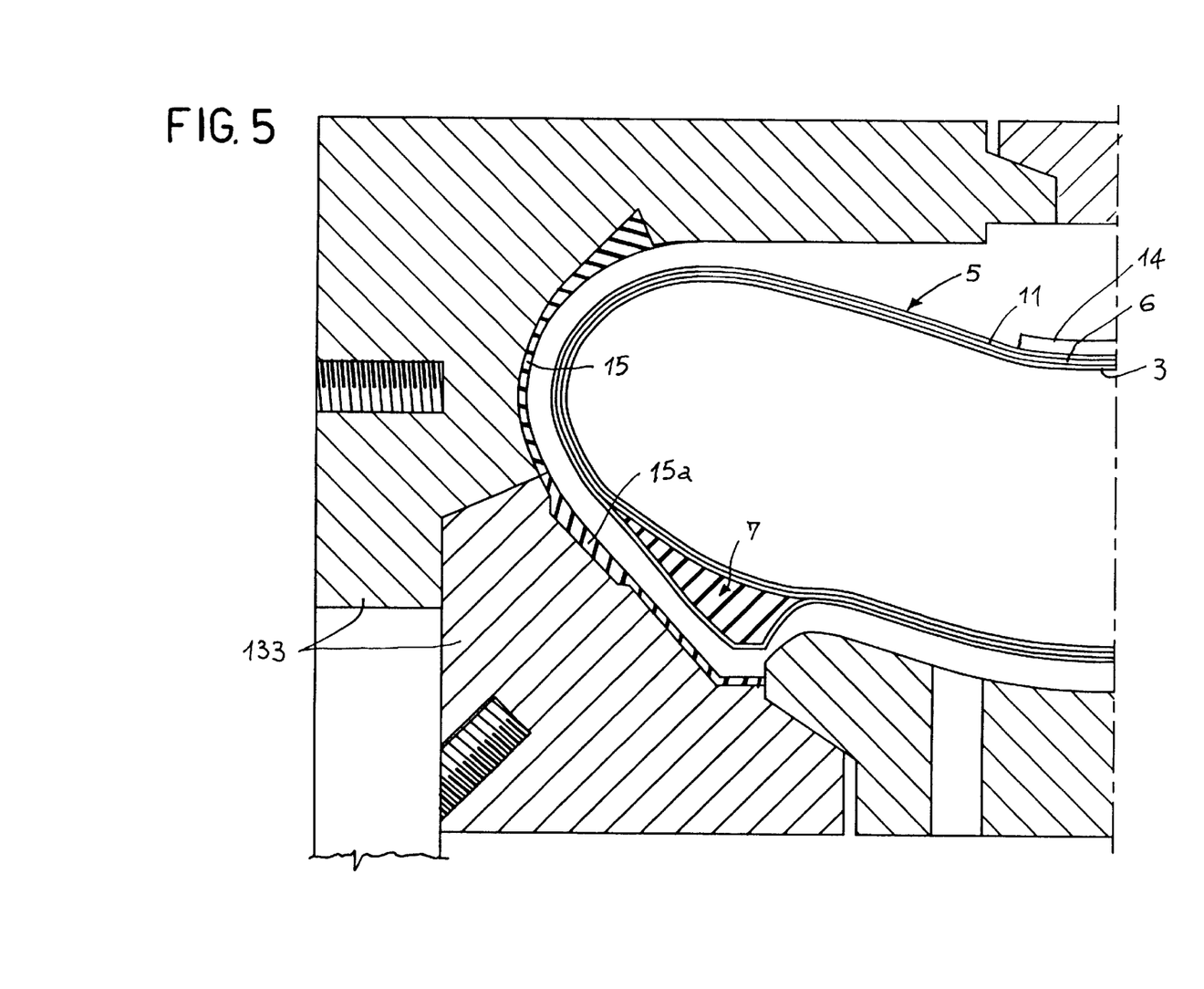
FIG. 5 diagrammatically shows the tire carcass seen in cross-section, introduced into a vulcanization mold, on closing of the mold.

Advantageously, the carcass structure 5 can be introduced into mold 133 while keeping the same pressure as created during the conformation step, or under deflated conditions, as in FIG. 5, and be subsequently inflated by admission of air or other fluid under pressure to the air tube 3 in order to ensure adhesion thereof to the inner mold walls during the vulcanization step. Carcass 5 can be advantageously maintained under inflated conditions even during the cooling step following vulcanization. This aspect is particularly advantageous in that it has been found that tire cooling under inflated conditions gives the tire better qualitative features.

The above described steps in connection with the belt structure 12 and tread band 13 manufacture give rise to a monolithic tire in which the carcass structure 5 is vulcanized simultaneously with the annular element comprised of said belt and tread band structures.

However, in accordance with the present invention, the belt structure 12 and tread band 13 may be provided to be mutually assembled separately from the carcass structure 5, to be applied to the latter before the tire vulcanization step. In accordance with a further alternative solution, the annular element formed of the belt structure 12 and the tread band 13 may be vulcanized separately from the carcass structure 5, to be associated with the latter subsequently to the carcass vulcanization.

In this case, the assembly formed of the belt structure 12 and tread band 13 can be easily replaced in case of damage to the tread band or wear thereof or when the tread band is to be replaced due to different operating requirements, if it is necessary to pass from a winter tread band to a summer tread band, for example.

In accordance with a further feature of the present invention, at least one circumferential hump 14 can be defined on the carcass structure 5 at a radially-outer position, said circumferential hump 14 engaging an anchoring seating conforming in shape to it and defined in the belt structure 12. This solution is particularly useful for fixing the axial positioning of the belt structure 12 and, consequently, the tread band 13 relative to the carcass structure 5, above all in the case in which the belt structure-tread band assembly is made as a replaceable element vulcanized separately from the carcass structure 5. In this case, it is advantageously possible to carry out a quick replacement of the tread band 13 together with the belt structure 12, in case of wear, for example, or when mounting of a tread band and belt having different operating features is required.

Said circumferential hump 14 can be obtained, for instance, by circumferential winding of at least one ribbon element, made of aramide pulp or other appropriate material, applied to the carcass structure 5.

Application of the circumferential hump 14 can be carried out by a sixth extrusion die 134, for example, operating at the eighth working station 120 shown in FIG. 6.

Further protection elements forming the tire, such as the sidewalls 15 and bead-protecting elements 15a, for example, can be associated with the carcass structure directly during the vulcanization step thereof. In this case, the sidewalls 15 and/or bead-protecting elements 15a and/or other protection elements can be obtained by injection of elastomer material into respective cavities defined within the vulcanization mold 133 when the latter is closed around the carcass structure 5. Once the inner core has been removed, the protection elements 15, 15a keep an adhering position relative to the inner mold walls, as shown in FIG. 5, to be then applied to the outer surfaces of the carcass structure 5 following closure and subsequent inflating of said carcass structure 5 within the vulcanization mold 133.

It is important to note that, in accordance with the present invention, the air tube 3 is preferably shaped by inflation to a first pressure, adapted to give said air tube 3 an elliptic conformation, and said shape is preferably maintained substantially unchanged over the whole manufacturing steps of the raw carcass.

During the vulcanization step, carcass structure 5, once it has been closed in mold 133, is inflated to a second pressure, higher than said first pressure, to bring it to adhere to the inner mold walls so as to obtain molding of the tread pattern impression and the sidewall pattern. Preferably, said second pressure is maintained during the following tire cooling step.

Still in accordance with the present invention, tire 1 lends itself to be utilized in combination with a rim 2, usually comprising a central portion (not shown) for connection to a hub of a vehicle wheel.

Rigidly linked to said central portion is coupling means for connection with tire 1 that, in accordance with the present invention, comprises a pair of circumferential abutment surfaces 16 located at axially-opposite positions relative to an equatorial median plane of the rim, coincident with the equatorial plane X-X of tire 1, and facing away from the equatorial plane itself.

Each of these circumferential abutment surfaces 16 conforms in shape to, and interacts with the main portion 7a of the corresponding annular anchoring element 7 that, within the tire structure, is located in the region usually identified as the bead. In more detail, as clearly shown in FIGS. 1 to 3, the main portions 7a of the annular anchoring elements 7 have respective locating sides 7e substantially facing each other and arranged to act and bear on the respective circumferential abutment surfaces 16. Thus, a stable axial positioning of the annular anchoring elements 7 is achieved. Each of them, in fact, cannot move towards the equatorial plane X-X of tire 1 in that it is retained by the corresponding circumferential abutment surface 16 of rim 2, and also cannot move away from said equatorial plane X-X in that it is connected to the other annular anchoring element 7 through the at least one first carcass ply 6 and/or the at least one second carcass ply. Preferably, a cylindrical centering surface 17 coaxial with the wheel rotation axis follows each of the circumferential abutment surfaces 16, away from the equatorial plane X-X, on which cylindrical centering surface 17 the inner circumferential edge of the cusp-shaped main portion 7a of the respective annular anchoring element 7 acts and bears.

In addition, an auxiliary circumferential locating portion 18 (denoted in chain line in FIGS. 1 and 3) may be arranged in the extension of each cylindrical centering surface 17, at an opposite position relative to the circumferential abutment surface 16, to give further assurance as regards the steady anchoring of annular anchoring element 7. In this case, preferably, the annular anchoring element 7 comprising said auxiliary circumferential locating portion 18 is fastened in a removable manner to rim 2 in order to facilitate tire fitting thereon.

As shown in FIG. 1, the circumferential abutment surfaces can be mutually interconnected by a cylindrical connecting portion 19, on which the inner circumferential region of the carcass structure 5 acts and bears.

Alternatively, cylindrical connecting portion 19 of rim 2 can be shaped in such a manner as to offer a curved cross-sectional profile, the concavity of which is turned externally of the rim itself as provided in the embodiment shown in FIG. 2. This embodiment gives better assurance for a steady coupling between annular anchoring elements 7 and the circumferential abutment surfaces 16. Actually, by effect of the pressure created within tire 1 following inflation thereof, the at least one first carcass ply 6 and/or the at least one second carcass ply match the concave profile of the cylindrical connecting portion 19, causing tensioning of said carcass plies and, as a result, an axial-thrust action of the annular anchoring elements 7 against the circumferential abutment surfaces 16 of rim 2. Preferably, the difference between the linear extension of the cross-sectional profile of the cylindrical connecting portion 19 and the axial distance between the opposite circumferential edges of this portion corresponds to the elastic elongation undergone by the carcass structure 5 at the region included between the annular anchoring elements 7 when the tire is submitted to an inner inflating pressure.

At least one pressure transducer 20 of known and conventional type may be also operatively engaged through the interconnecting portion of rim 2, said transducer being adapted to detect the inner pressure of tire 1 through the thrust exerted by the at least one first carcass ply 6 and/or the at least one second carcass ply of the carcass structure 5.

Advantageously, the presence of pressure transducer 20 does not involve any problem and does not require any particular expedient as regards airtightness in tire 1. In fact, since tire 1 is of tubular structure, it is perfectly capable of retaining the air contained therein without requiring any cooperation by rim 2 for this purpose. Pressure transducer 20, engaged through rim 2, is located externally of tire 1 and therefore it is unimportant as regards airtightness.

Alternatively, for the purpose of facilitating operations for assembling and disassembling the tire to and from the corresponding rim 2, this rim can be made in a dismountable manner, that is made of two or more separate parts removably linked to each other to form a complete rim. These separate parts may comprise at least one disc for connection with the vehicle hub, to which a ring is fastened, which ring at a radially-outer position has the same profile as defined by the circumferential abutment surfaces 16 and the cylindrical connecting portion 19.

In accordance with a further possible embodiment shown in FIG. 3, rim 2 can be devoid of any interconnecting portion between the circumferential abutment surfaces 16. In this case, the carcass structure 5 will be free to take a convex configuration as a result of inflation, within a space 26 defined between the circumferential abutment surfaces 16 that will be mechanically interconnected by means of said central portion or in another similar manner.

The invention achieves important advantages over the known art.

The tire in reference is in fact obtained by forming the carcass structure 5 directly around a pre-vulcanized air tube 3 utilized as a support for making said carcass structure 5 as well as for applying the other different tire components.

Thus it is possible to eliminate many intermediate working steps that, in tires made in accordance with the known art, were executed for obtaining carcass plies and other different workpieces to be assembled in the subsequent tire-manufacturing steps.

In conclusion, the tire structure in accordance with the invention enables the intermediate manufacturing processes to be drastically simplified so that the whole tire-manufacturing process can be, for instance, carried out on a single apparatus comprising different carrousel-disposed working stations, as shown in FIG. 6.

It is also to note that in the tire in question, the beads are less stressed than in known tires, in part because no function concerning airtightness relies on them. As a result, reinforcing elements of metal material can be eliminated, at least when the tire is not of the heavy-duty type, which will be advantageous for recycling of the materials at the end of the useful tire life.

Under this point of view it is to note that co-existence of metal elements incorporated in the elastomer material has always been a serious problem.

In addition, due to the absence of metal elements, heat supply for the vulcanization step can take place by means of microwaves instead of using steam as in known processes.

This aspect, too, represents an important advantage for the purpose of simplifying the production plants and in terms of production speed.

However, in the presence of reinforcing elements of metal material, vulcanization can in any case be advantageously carried out in induction furnaces, in which heat transmission takes place by electromagnetic induction through the mold walls.

The construction conception of the tire in reference and the modalities according to which it is engaged with the respective rim causes the tire to be in any case efficiently anchored to the rim also in the absence of any outer shoulder, even if the tire, due to a puncture, for example, is obliged to run in the absence of pressure inside it, that is, in the condition known by technicians as "flat running". As above described, in fact, beads are fixedly retained between the circumferential abutment surfaces 16 of the rim 2, without any possibility of axial displacements either in the direction of the equatorial median plane, or away therefrom.

Tire-rim coupling is therefore adapted to enable running in a sufficiently safe manner even when the tire is completely deflated.

Another advantage achieved by the invention consists in ensuring an excellent structural homogeneity of the tire carcass that cannot be found in traditional tires having an open sectional profile.

In particular, carcass plies do not have any irregularity resulting from partial overlapping of the ply portions that, in accordance with known processes, are consecutively coupled so as to form a carcass ply of the desired circumferential extension. In addition, formation of carcass plies by direct winding of continuous cords around the air tube of toroidal conformation ensures an excellent structural uniformity of the carcass plies themselves.

Another advantage achieved by the present invention is to enable an important reduction-in-weight of the rim, since the presence of outer shoulders is no longer necessary and, above all, also the connecting portion between the opposite side portions of the rim is not required anymore, which portion in the known art necessarily needed an uninterrupted extension for achieving airtightness.

It is also to note that coupling between the tire and rim in accordance with the present invention is capable of greatly facilitating operations for assembling and disassembling the tire to and from the rim. This is, in particular, due to the fact that it is not necessary to arrange on the rims flanges of important radial extension acting on the tire beads from the outside. Even in the presence of inner flanges, the latter can advantageously have very reduced radial sizes as compared with those required when known open-profile tires are employed. The outer flanges can be also mounted in a removable manner, by screws or equivalent connecting means.

Another advantage for improvement of a modular production system resides in the possibility of making the belt structure with the tread band as a pre-vulcanized element to be associated with the carcass structure. In addition, the tread band together with the belt can be easily replaced once it is worn out, so that usual operations for tire recapping are eliminated.

What is claimed is:

1. A method of making a tire for vehicle wheels, comprising the steps of:
   preparing an inflatable core of toroidal conformation, having a transverse profile in the form of a closed ring;
   shaping the inflatable core into a substantially elliptic conformation by inflation to a preestablished pressure; and
   maintaining the preestablished pressure in the inflatable core during at least the first of the following steps:
      covering the inflatable core with a carcass structure by winding at least one first thread element around the transverse profile of the inflatable core so as to form first turns disposed consecutively in side-by-side relationship along the circumferential extension of the inflatable core to define a first carcass ply integrally covering the inflatable core; and
      associating a circumferentially-inextensible belt structure and a tread band circumferentially external to the belt structure with the carcass structure, at a radially outer position relative to the carcass structure.

2. The method of claim 1, wherein the step of preparing the inflatable core includes the step of forming portions of the inflatable core having a differentiated resistance to pressure.

3. The method of claim 1, wherein the inflatable core is pre-vulcanized before the shaping step.

4. The method of claim 1, wherein the step of preparing the inflatable core includes the steps of:

injecting an elastomer material into two opposite cavities defined between two respective mold-halves and a forming body or former interposed between the mold-halves, to define two halves of the inflatable core;

removing the forming body or former from the mold-halves;

moving the mold-halves close to each other so as to make the inflatable core halves fit together at respective junction-end edges; and pre-vulcanizing the inflatable core within the mold-halves.

5. The method of claim 1, wherein the winding of the at least one first thread element is carried out by causing rotation of a reel carrying the thread element around the transverse profile of the inflatable core, while substantially rotating the inflatable core about its own geometric axis of rotation.

6. The method of claim 5, wherein the winding of the at least one first thread element around the transverse profile of the inflatable core takes place at a portion of the inflatable core guided between two mutually-opposite guide collars.

7. The method of claim 1, wherein the winding of the at least one first thread element is preceded by a step of applying a first layer of raw elastomer material to the inflatable core.

8. The method of claim 1, further comprising the step of applying a pair of annular anchoring elements to the first carcass ply, the anchoring elements being spaced apart from each other and extending circumferentially at a radially inner position relative to the inflatable core.

9. The method of claim 8, further comprising the step of incorporating at least one circumferentially-inextensible annular reinforcing insert into each of the annular anchoring elements.

10. The method of claim 1, wherein manufacture of the belt structure and tread band includes the following steps:

circumferentially applying at least one belt strip to a support drum to form the belt structure; and circumferentially applying a tread band of raw elastomer material to the belt structure, so that the belt structure and tread band form an annular element to be coupled with the carcass structure.

11. The method of claim 10, wherein the tread band includes at least one continuous elongated element of elastomer material applied to the belt structure, so as to form turns disposed consecutively in side-by-side relationship.

12. The method of claim 10, wherein the annular element and carcass structure are vulcanized separately from each other and mutually coupled in a removable manner.

13. The method of claim 12, wherein at least one circumferential hump is formed at a radially outer position on the carcass structure before vulcanization of the carcass structure, and wherein at least one anchoring seating conforming in shape to the circumferential hump is defined in the belt structure before vulcanization of the belt structure.

* * * * *